United States Patent
Wessel et al.

(10) Patent No.: US 7,364,711 B2
(45) Date of Patent: Apr. 29, 2008

(54) METHOD FOR REMOVING $N_2O$ DURING THE PRODUCTION OF NITRIC ACID

(75) Inventors: Helge Wessel, Mannheim (DE); Stefan Kotrel, Ludwigshafen (DE); Michael Bender, Ludwigshafen (DE)

(73) Assignee: BASF Aktiengesellschaft, Ludswigshafen (DE)

( * ) Notice: Subject to any disclaimer, the term of this patent is extended or adjusted under 35 U.S.C. 154(b) by 104 days.

(21) Appl. No.: 10/561,787

(22) PCT Filed: Jun. 8, 2004

(86) PCT No.: PCT/EP2004/006162

§ 371 (c)(1), (2), (4) Date: Dec. 21, 2005

(87) PCT Pub. No.: WO2005/000738

PCT Pub. Date: Jan. 6, 2005

(65) Prior Publication Data

US 2007/0098613 A1    May 3, 2007

(30) Foreign Application Priority Data

Jun. 23, 2003 (DE) ................. 103 28 278

(51) Int. Cl.
*B01D 53/56* (2006.01)
*B01J 19/00* (2006.01)
*C01B 21/38* (2006.01)

(52) U.S. Cl. .......... 423/239.1; 423/392; 423/393; 502/300; 502/325; 502/355; 502/305; 502/527.24; 422/129; 422/211

(58) Field of Classification Search ............ 423/392, 423/393, 239.1; 502/300, 325, 355, 305, 502/527.24; 422/129, 211
See application file for complete search history.

(56) References Cited

U.S. PATENT DOCUMENTS

| | | | | |
|---|---|---|---|---|
| 5,250,490 A | * | 10/1993 | Ritscher et al. | 502/313 |
| 5,266,546 A | * | 11/1993 | Hearn | 502/300 |
| 5,314,673 A | * | 5/1994 | Anseth et al. | 423/239.1 |
| 5,478,549 A | | 12/1995 | Koch | |
| 5,612,009 A | * | 3/1997 | Fetzer et al. | 423/239.1 |
| 6,649,134 B2 | * | 11/2003 | Gorywoda et al. | 423/239.1 |
| 6,743,404 B1 | * | 6/2004 | Schumacher et al. | 423/239.1 |
| 6,890,499 B2 | * | 5/2005 | Schwefer | 423/239.1 |
| 7,192,566 B2 | * | 3/2007 | Duclos et al. | 423/351 |
| 2002/0127932 A1 | * | 9/2002 | Neumann et al. | 442/6 |
| 2006/0008401 A1 | * | 1/2006 | Hotta et al. | 423/239.1 |

FOREIGN PATENT DOCUMENTS

| | | |
|---|---|---|
| DE | 198 05 202 | 2/1999 |
| DE | 198 19 882 | 10/1999 |
| WO | 99/07638 | 2/1999 |
| WO | 01/87771 | 11/2001 |
| WO | 02/092196 | 11/2002 |

OTHER PUBLICATIONS

Ullmann's Encyclopedia of Industrial Chemistry, 5th edition, vol. A17, pp. 294-339 1991.

* cited by examiner

*Primary Examiner*—Timothy C. Vanoy
(74) *Attorney, Agent, or Firm*—Oblon, Spivak, McClelland, Maier & Neustadt, P.C.

(57) ABSTRACT

$N_2O$ is removed in nitric acid manufacture by using catalysts comprising three-dimensional structures coated with catalytically active materials.

9 Claims, No Drawings

METHOD FOR REMOVING N₂O DURING THE PRODUCTION OF NITRIC ACID

The present invention relates to processes for removing $N_2O$ in nitric acid manufacture by means of coated three-dimensional articles.

When nitric acid is produced on a large industrial scale, for example by the Ostwald process (Ullmann's Encyclopedia of Industrial Chemistry, 5th edition, volume A 17, pages 293 to 339 (1991)), the burning of ammonia with oxygen over a noble metal catalyst gives rise not only to nitrogen monoxide and nitrogen dioxide (or dinitrogen tetroxide) but generally also $N_2O$ (nitrous oxide, dinitrogen monoxide) as a by-product. Unlike the other nitrogen oxides formed, $N_2O$ is not absorbed by water during the absorption process. Unless there is an abatement stage to remove the greenhouse gas $N_2O$, it will escape in the exit gas.

U.S. Pat. No. 5,478,549 discloses a process for the manufacture of nitric acid by the Ostwald process wherein the $N_2O$ content is lowered by passing the post-oxidation gas stream at 600° C. or above over a catalyst bed of zirconium oxide in the form of cylindrical pellets, disposed underneath a noble metal recovery gauze.

DE-A-198 05 202 and DE-A-198 19 882 disclose catalysts, in geometric shapes such as pellets, cylinders or strands for example, for catalytic decomposition of $N_2O$ in the manufacture of nitric acid.

Heretofore known catalysts have the disadvantage that they are present in the form of compact beds of individual shaped catalyst bodies, the gas permeability of which cannot be adjusted in a controlled manner (pressure drop and high mechanical and static load).

It is an object of the present invention to remedy the aforementioned disadvantages.

We have found that this object is achieved by a novel and improved process for removing $N_2O$ in nitric acid manufacture, which comprises using catalysts comprising three-dimensional structures coated with catalytically active materials.

Useful three-dimensional structures include moldings, gauzes, wovens, drawn-loop knits, wire packs, comb (i.e., honeycomb) structures, ceramic monoliths, preferably comb structures, wovens, drawn-loop knits, gauzes, wire packs, more preferably wovens, drawn-loop knits, gauzes.

Useful materials for the wire wovens include all high temperature stable materials of construction such as special steel, Hasteloy C, V2A or Kanthal (Fe—Cr—Al alloy, for example German material of construction code number 1.4767), preferably Kanthal.

The wire wovens can be used in any desired form, for example as wovens, as woven layers or as woven packs. Woven packs are producible as follows:

Woven and drawn-loop knit packs are for example simple to produce (by winding up or superposing two or more differently structured lengths of the woven and drawn-loop knit webs) as three-dimensional structures which are substantially conformable to the reactor's cross section. By substantially is meant in the present invention that there is no need for exact conformation to the column's cross section, but that fabrication tolerances are permitted.

The pack is predominantly embodied as a roll which was obtained by winding up two or more differently structured lengths of the woven and drawn-loop knit webs. However, other geometric shapes are possible as well, especially a cuboid shape obtained by superposing webs.

The wire of the wovens or woven packs is generally from 5 to 5000 μm, preferably from 50 to 500 μm, more preferably from 60 to 400 μm, and especially from 70 to 250 μm in diameter and generally from 5 to 5000 μm, preferably from 50 to 750 μm, more preferably from 60 to 600 μm, and especially from 70 to 450 μm in mesh size.

Useful catalytically active materials include oxides such as for example MgO, CoO, $MoO_3$, NiO, ZnO, $Cr_2O_3$, $WO_3$, SrO, $CuO/Cu_2O$, $MnO_2$ or $V_2O_5$, mixed oxides such as $CuO$—$ZnO$—$Al_2O_3$, $CoO$—$MgO$, $CoO$—$La_2O_3$, $La_2CuO_4 \cdot Nd_2CuO_4$, Co—ZnO, or NiO—$MoO_3$, perovskites such as $LaMnO_3$, $CoTiO_3$, $LaTiO_3$, $CoNiO_3$ and spinal such as $CuAl_2O_4$, $ZnAl_2O_4$, $MgAl_2O_4$, (Cu, Zn) $Al_2O_4$, (Cu, Zn, Mg) $Al_2O_2$, (Cu, Zn, Ba) $Al_2O_4$, (Cu, Zn, Ca) $Al_2O_4$, $La_2NiO_4$, preferably spinal such as $CuAl_2O_4$, $ZnAl_2O_4$, $MgAl_2O_4$, (CuZn) $Al_2O_4$, (CuZnMg) $Al_2O_4$, (CuZnBa)—$Al_2O_4$, (CuZnCa) $Al_2O_4$, more preferably spinal such as $CuAl_2O_4$, (CuZn) $Al_2O_4$, (CuZnMg) $Al_2O_4$.

Preferably, the catalytically active material comprises from 0.1% to 30% by weight of CuO, from 0.1% to 40% by weight of the further metal oxide, especially ZnO, and from 50% to 80% by weight of $Al_2O_3$.

Particular preference is given to a catalytically active material which comprises about 8% by weight of CuO, 30% by weight of ZnO and 62% by weight of $Al_2O_3$. As well as the spinal, very small amounts of CuO and further metal oxide will be present as well.

Preferably, more than 3.5% by weight of CuO and more than 10% by weight of ZnO are present.

The preparation of catalytically active materials is common knowledge or can be effected by commonly known processes for preparing these materials.

The wire of the wovens or woven packs can be coated as follows:

Prior to coating, the wire of the wovens or woven packs can be heat treated, for example at from 100 to 1500° C., preferably from 200 to 1400° C., and more preferably from 300 to 1300° C.

Coating can take place before or after, preferably after, shaping to form woven packs.

The coating with catalytically active materials can be effected by vapor deposition, sputtering, impregnation, dipping, spraying or coating with powders, preferably with an aqueous and/or alcoholic solution or suspension, preferably with an aqueous suspension.

The solids content of the suspension is generally in the range from 2% to 95%, preferably in the range from 3% to 75%, and more preferably in the range from 5% to 65%.

After coating, the catalyst packs are generally heat treated at from 100 to 1500° C., preferably from 200 to 1300° C., and more preferably at from 300 to 1100° C.

The weight ratio of coating to wire can be varied within wide limits and is generally in the range from 0.01:1 to 10:1, preferably in the range from 0.1:1 to 2:1, and more preferably in the range from 0.3:1 to 1:1.

The inventive wire woven can be placed at any desired location of the reactor for nitric acid production downstream of the production of nitrogen oxides, preferably in a region where the temperature is in the range from 500 to 980° C., preferably from 600 to 970° C., more preferably in the range from 700 to 960° C., especially at the temperature level of the preceding ammonia oxidation at a pressure in the range from 1 to 15 bar, more preferably between the noble metal gauze catalyst (if appropriate provided with a noble metal recovery gauze) and the heat exchanger.

The wire wovens are generally used as a fixed bed pack. The catalyst bed is generally from 1 to 150 cm, preferably from 2 to 50 cm, and more preferably from 5 to 10 cm deep. The residence time over the catalyst bed is generally shorter than 1 second, preferably shorter than 0.5 second and more preferably shorter than 0.3 s in normal operation.

The inventive wire wovens can be disposed between the noble metal catalyst/optional noble metal recovery gauze and heat exchanger in reactors for catalytic oxidation of ammonia to nitrogen oxides that comprise a noble metal catalyst, if appropriate a noble metal recovery gauze and a heat exchanger in the stated order in the flow direction.

The apparatus for producing nitric acid from ammonia comprises in the stated order
a) a reactor according to the preceding paragraph,
b) an absorption unit for absorbing nitrogen oxides in an aqueous medium, and if appropriate
c) a reduction unit for selective catalytic reduction of nitrogen oxides.

EXAMPLES

Preparation Example 1

A Kanthal metal woven band (100 cm long, 3.7 cm wide), German material of construction code number 1.4767 (from Montz GmbH, D-40705 Hilden), was air annealed at 900° C. for 4 h and subsequently corrugated with a toothed wheel roller (1.0 mm in modulus) and rolled up with a smooth metal woven band 97 cm in length to form a pack having vertical channels 4.1 cm in diameter. The pack thus obtained was impregnated with a suspension composed of 100 g of Disperal® Al25 (from Sasol), 100 g of water and 25 g of catalytically active powder of the composition: 20% by weight of ZnO, 16% by weight of CuO, 64% by weight of $Al_2O_3$, dried at 120° C. for 2 h and heat treated in air at 950° C. The increase in pack weight due to impregnation was 11.6% after the annealing.

Preparation Example 2

A Kanthal metal woven band was treated similarly to Preparation Example 1. Pieces of this metal woven band which were 16.7 cm in length and 2 cm in width were corrugated with a toothed wheel roller 1.0 mm in modulus and superposed to form a cuboid monolith 7 cm in length which had vertical channels and was 2 cm high and deep and was joined together with 3 V2A wires. The pack thus obtained was impregnated with a suspension composed of 100 g of Disperal® Al25 (from Sasol), 100 g of water and 25 g of catalytically active powder of the composition: 20% by weight of ZnO, 16% by weight of CuO, 64% by weight of $Al_2O_3$, dried at 120° C. for 2 h and heat treated in air at 900° C. for 12 h. The increase in pack weight due to impregnation was 13.4% after the annealing.

Example 1

Ammonia in an ammonia-air mixture having an ammonia concentration of 12% by volume and an air concentration of 88% by volume was reacted over a Pt/Rh gauze at a space velocity of 36 g/h of ammonia per $cm^3$ of gauze area at 900° C. in a laboratory apparatus to form nitrogen monoxide. A 10 cm deep layer of the catalyst of Preparation Example 1 was disposed immediately downstream of the platinum gauze, and the reaction gas flowed through said layer at 800° C. with a residence time of about 0.03 s. $N_2O$ decreased by 92% by volume. The pressure drop across the catalyst bed was 250 mbar.

Example 2

Example 1 was repeated with the catalyst of Preparation Example 2. $N_2O$ decreased by 90% by volume. The pressure drop across the catalyst bed was 192 mbar.

Comparative Example 1

Similarly to Example 1 of DE-A-198 19 882

The reaction was conducted similarly to Example 1 except that the 10 cm deep layer of catalyst disposed immediately downstream of the platinum gauze was composed of 18% by weight of CuO, 20% by weight of ZnO and 62% by weight of $Al_2O_3$ in the form of 3 mm extrudates. $N_2O$ decreased by 85% by volume. The pressure drop across the catalyst bed was 1450 mbar.

Comparative Example 2

Similarly to Example 1 of DE-A-198 19 882

Comparative Example 1 was repeated using 6 mm extrudates. $N_2O$ decreased by 80% by volume. The pressure drop across the catalyst bed was 1345 mbar.

We claim:

1. A process for removing $N_2O$ comprising contacting a gas mixture comprising $N_2O$ and at least one other gas with at least one catalyst comprising wire wovens and/or drawn-loop knits comprised of high-temperature-stable materials coated with catalytically active materials.

2. The process for removing $N_2O$ according to claim 1, wherein the wire wovens and/or drawn-loop knits comprise Fe—Cr—Al alloys coated with catalytically active materials.

3. The process for removing $N_2O$ according to claim 1, wherein the wire or the wire wovens and/or drawn-loop knits comprising high-temperature-stable materials are heat treated at from 100 to 1500° C. prior to coating.

4. The process for removing $N_2O$ according to claim 1, wherein the wire woven and/or drawn-loop knit coated with catalytically active materials forms a catalyst bed from 1 to 150 cm deep.

5. The process for removing $N_2O$ according to claim 1, wherein at the wire woven and/or drawn-loop knit coated with catalytically active materials is located in a reactor where the temperature is in the range from 500 to 980° C.

6. The process for removing $N_2O$ according to claim 1, wherein the residence time of the nitrogen oxides within the wire woven and/or drawn-loop knit coated with catalytically active materials is less than 1 second.

7. The process for removing $N_2O$ according to claim 1, wherein the gas mixture comprising $N_2O$ and at least one other gas is a by-product of nitric acid production.

8. A reactor for catalytic oxidation of ammonia to nitrogen oxides which comprises a noble metal catalyst, an optional noble metal recovery network, and a heat exchanger in the stated order in the flow direction, wherein a wire woven and/or drawn-loop knit comprising high-temperature-stable materials coated with catalytically active materials is disposed between the noble metal catalyst/optional noble metal recovery network and the heat exchanger.

9. An apparatus for producing nitric acid from ammonia, comprising in the stated order
a) a reactor according to claim 8,
b) an absorption unit for absorbing nitrogen oxides in an aqueous medium, and if appropriate
c) a reduction unit for selective catalytic reduction of nitrogen oxides.

* * * * *